US009992538B2

(12) United States Patent
Karanth

(10) Patent No.: US 9,992,538 B2
(45) Date of Patent: Jun. 5, 2018

(54) SYSTEMS AND TECHNIQUES FOR DETERMINING USER ENGAGEMENT WITH VIDEO ADVERTISEMENTS TO DETERMINE OPTIMIZED COST PER IMPRESSIONS

(71) Applicant: Adobe Systems Incorporated, San Jose, CA (US)

(72) Inventor: Shrinidhi Karanth, Bengaluru (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days. days.

(21) Appl. No.: 15/006,932

(22) Filed: Jan. 26, 2016

(65) Prior Publication Data

US 2017/0214952 A1    Jul. 27, 2017

(51) Int. Cl.

| H04N 7/173 | (2011.01) |
|---|---|
| H04N 21/442 | (2011.01) |
| H04N 21/81 | (2011.01) |
| H04N 21/466 | (2011.01) |
| H04N 21/2547 | (2011.01) |
| H04N 21/414 | (2011.01) |
| H04N 21/658 | (2011.01) |

(52) U.S. Cl.
CPC ... *H04N 21/44218* (2013.01); *H04N 21/2547* (2013.01); *H04N 21/41407* (2013.01); *H04N 21/44204* (2013.01); *H04N 21/4667* (2013.01); *H04N 21/6582* (2013.01); *H04N 21/812* (2013.01)

(58) Field of Classification Search
CPC .... H04N 21/25; H04N 21/81; H04N 21/2387; H04N 21/466; H04N 21/2547; H04N 21/6587; H04N 21/442
See application file for complete search history.

(56) References Cited

U.S. PATENT DOCUMENTS

| 6,468,056 B1 * | 10/2002 | Murakoshi | .......... F04B 43/0081 |
| | | | 417/395 |
| 8,468,056 B1 * | 6/2013 | Chalawsky | ........ H04N 21/2547 |
| | | | 705/14.41 |
| 8,473,975 B1 * | 6/2013 | Besehanic | ........ H04N 21/44218 |
| | | | 725/10 |
| 8,560,453 B2 * | 10/2013 | Pendakur | ........... G06Q 30/0241 |
| | | | 705/14.4 |
| 9,465,435 B1 * | 10/2016 | Zhang | ..................... G06F 3/01 |

(Continued)

*Primary Examiner* — John Schnurr
(74) *Attorney, Agent, or Firm* — Kilpatrick Townsend & Stockton LLP

(57) ABSTRACT

Systems and methods disclosed herein provide for determining changes in the device engagement data as a video advertisement is played on a video application executing in a mobile computing device. A user engagement engine collects device engagement data over multiple intervals of playback of the video advertisement. The device engagement data includes data indicating the spatial orientation of the mobile computing device and data indicating the volume level. The user engagement engine also calculates the differences in the device engagement data from a first interval of playback to a second interval of playback of the video advertisement. The mobile computing device transmits the changes in the device engagement data to an advertising server. The advertising server uses the changes in the device engagement data to determine a cost-per-impression value of the video advertisement.

20 Claims, 5 Drawing Sheets

(56) References Cited

U.S. PATENT DOCUMENTS

| | | | |
|---|---|---|---|
| 2012/0124604 A1* | 5/2012 | Small | H04N 21/4223 |
| | | | 725/12 |
| 2012/0158520 A1* | 6/2012 | Momeyer | H04W 64/006 |
| | | | 705/14.69 |
| 2015/0033266 A1* | 1/2015 | Klappert | G06F 3/015 |
| | | | 725/52 |
| 2015/0243329 A1* | 8/2015 | Hadorn | H04N 21/44209 |
| | | | 386/230 |
| 2016/0037213 A1* | 2/2016 | Collins | H04N 21/44218 |
| | | | 725/10 |

* cited by examiner

… (US 9,992,538 B2)

SYSTEMS AND TECHNIQUES FOR DETERMINING USER ENGAGEMENT WITH VIDEO ADVERTISEMENTS TO DETERMINE OPTIMIZED COST PER IMPRESSIONS

TECHNICAL FIELD

This disclosure relates generally to computer-implemented methods and systems and more particularly relates to utilizing sensors of a computing device to detect user engagement of video advertisements.

BACKGROUND

In a computer-implemented networked environment, advertising servers present video advertisements from advertising entities to numerous computing devices that are streaming video content or otherwise viewing/downloading electronic content from a video publisher over the network. For example, a computing device executes a video player application in a web browser to stream video content from an online content publisher. During an advertising break in the video content, the advertising server transmits the video advertisement to the video player application.

In one common type of business arrangement, video advertisements are played at different points in the video content and are charged to the advertising entity on a cost-per-impression basis. The cost-per-impression specifies the cost of the advertisement each time the advertisement is played. The advertising entity is charged for the played video advertisement regardless of the end user's engagement with the video advertisement. For example, if at any point during playback of a video advertisement turns down the volume of the computing device, or otherwise disengages from the video advertisement playback, the advertising entity is still charged for the playback. There is a need to determine the end user's engagement of the video advertisement to more efficiently and accurately charge advertising entities for playback of the video advertisement.

SUMMARY

Systems and methods disclosed herein determine changes in the spatial orientation and volume level of a mobile device throughout playback of a video advertisement to determine a cost-per-impression value for the video advertisement. Changes in the spatial orientation and volume level of the mobile device as the video advertisement plays are interpreted as indications of changes in the user's engagement of the video advertisement. The embodiments disclosed herein allow an advertising entity to more accurately determine the cost-per-impression value of a video advertisement by taking into account whether the user actually viewed the advertisement or how engaged the user was with the advertisement.

In one embodiment, upon playback of a video advertisement, a user engagement engine executing in a mobile computing device determines the spatial orientation or volume setting at the beginning of the video advertisement. The spatial orientation is indicated by, for example, pitch and roll values reported by an accelerometer sensor on the mobile computing device. As the video advertisement plays on a video application, the user engagement engine continues to monitor the spatial orientation or the volume setting of the mobile computing device. For example, the user engagement engine collects data on the spatial orientation and the volume setting at a first interval of playback and a second interval of playback. The mobile computing device further calculates the difference between the spatial orientation at the beginning of the video advertisement (e.g., the pitch value and the roll value at the beginning of the advertisement) and at a second interval of playback of the video advertisement. The mobile computing device transmits the difference in the spatial orientation or volume level to an advertising server.

The advertising server determines a cost-per-impression value for the video advertisement based on the data reported from the mobile computing device. For example, data indicating that the spatial orientation or the volume level of the mobile computing device remained similar throughout playback indicates that the user engagement is high. Data indicating that the spatial orientation or the volume level has changed in an amount greater than a threshold value indicates that the user engagement is low (e.g., if the pitch value and the roll value of the mobile computing device changed by being held upright to being placed on a surface parallel to the ground). The cost-per-impression determined by the advertising server is proportional to the user engagement. When the user engagement of the video advertisement is high, the advertising server determines a high cost-per-impression value. When the user engagement of the video advertisement is low, the advertising server determines a low cost-per-impression value.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
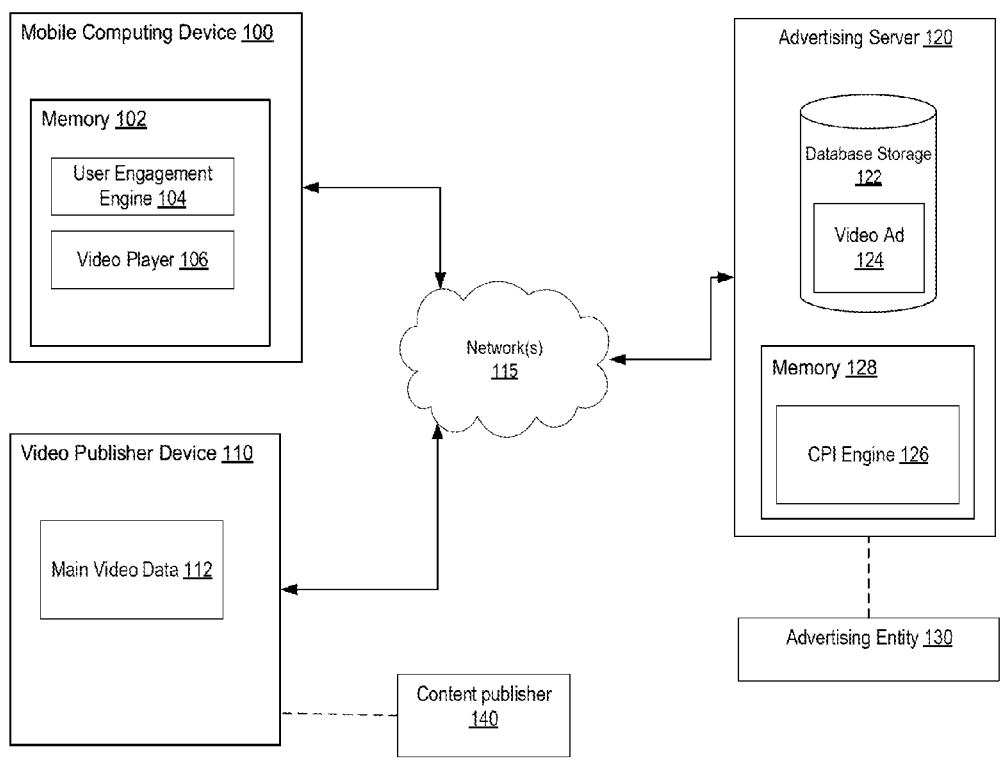
FIG. 1 is a block diagram depicting an example of a system for determining changes in user engagement in a video advertisement to determine a cost-per-impression value for the video advertisement.

Computer-implemented systems and method are disclosed for determining the user engagement of a video advertisement based on feedback provided from an operating system executing on a mobile computing device equipped with sensors for detecting the spatial orientation of the mobile computing device. Examples of a mobile computing device include a smartphone and a tablet computer. A user engagement engine (e.g., application code executing as part of or as an add-on to a video player application) executing on the mobile computing device collects information relating to how engaged a user is in viewing a video advertisement. For example, the user engagement engine collects current accelerometer values for the pitch and roll of the mobile computing device and also, collects the volume levels of the mobile computing device. The pitch and roll of the mobile computing device are angular values that indicate the position of the mobile computing device in space. The accelerometer values and the volume levels of the mobile computing device are referred to herein as the device engagement data. The user engagement engine is able to collect information related to user engagement as a background process without affecting the user video viewing experience. The user engagement engine collects the device engagement data repeatedly at different intervals as the video advertisement is played on a video player of the mobile computing device. For example, the user engagement engine collects the device engagement data at the start of the video advertisement and again collects the device engagement data at the 25% video advertisement playback interval, 50% video advertisement playback interval, 75% video advertisement playback interval, and once 100% of the video advertisement has played back. Every time the user engagement engine collects the device engagement data, the mobile computing device transmits the collected device engagement data to an advertisement server. Based on any changes in the pitch and roll values or the volume levels or both during playback of a video advertisement, the advertisement server determines a user engagement value. The advertisement server scales the cost-per-impression (CPI) value for the video advertisement based on the user engagement value.

As a more detailed example, a mobile computing device receives a first set of electronic data comprising main video content and advertising credentials identifying the publisher of the video content. The mobile computing device also receives a second set of electronic data comprising a video advertisement and a tracking link for reporting device engagement data to an advertising server. A user engagement engine executing on the mobile computing device interfaces with a video player or other application (e.g., a web browser) used to play the video advertisement. For example, in one embodiment the user engagement engine is a standalone application that interfaces with the video player or web browser via an application programming interface (API) exposed by the video player or web browser. In another embodiment, the user engagement engine is a plugin, module, or similar add-on to the video player or web browser. In another embodiment, the user engagement engine is integrated within the application code for the video player or web browser. Via the interface with the video player or web browser, upon playback of the video advertisement, the user engagement engine receives information indicating that playback has initiated. Upon playback of the video advertisement, the user engagement engine collects and records device engagement data via an application programming interface (API) command to the operating system of the mobile computing device (the API exposed by the operating system different from the API exposed by the video player or web browser that is described above). The mobile computing device transmits the collected device engagement data (indicating the accelerometer or volume level values of the mobile computing device at the beginning of playback of the video advertisement) to the advertising server identified by the tracking link. Once a certain portion of the video advertisement has played on the video player of the mobile computing device (e.g., 25% of the video advertisement, 50%, or any other portion), the user engagement engine again collects device engagement data via an API command to the operating system. In one example, the mobile computing device transmits the collected device engagement data at 25% playback (indicating the accelerometer or volume level values of the mobile computing device at 25% of the video advertisement playback) to the advertising server. The mobile computing device continues to collect and transmit device engagement data at 50% of the video advertisement playback, 75% of the video advertisement playback, and 100% of the video advertisement playback. As the mobile computing device collects device engagement data, the mobile computing device also calculates changes in the device engagement data. For example, the mobile computing device calculates how device engagement data changed from the beginning of the video advertisement to the various intervals of playback of the video advertisement. In one embodiment, along with the device engagement data, the mobile computing device transmits the changes in the device engagement data to the advertising server. In another embodiment, the mobile computing device calculates the changes to the device engagement data and only transmits the changes in the device engagement data to the advertising server (and not the collected device engagement data). In another embodiment, the mobile computing device only transmits the device engagement data to the advertising server (and not the changes to the device engagement data) and the advertising server calculates the changes in the device engagement data.

Based on the changes in the device engagement data, a user engagement score is determined. The user engagement score may be calculated by the mobile computing device or the advertising server. For example, in one embodiment the mobile computing device transmits changes to the device engagement data to the advertising server and the advertising server determines a user engagement score for the video advertisement. In another embodiment, the mobile computing device calculates the user engagement score and transmits the user engagement score to the advertising server.

Changes in the device engagement data indicate decreased or increased user engagement. For example, if the accelerometer values indicate a substantial change (i.e. a change greater than a certain threshold value) in the roll and pitch of the mobile computing device during playback of the video advertisement, the user engagement is considered to have decreased. User engagement is considered decreased because, if the pitch and roll values change by a certain percentage, it is likely the user of the mobile computing device is no longer viewing the screen and thus not viewing the advertisement. For example, the roll and pitch of the smartphone may change if the end user moves the mobile computing device by from a handheld position to a flat on a table or other flat surface. In this example the pitch of the mobile computing device changes from an angle between 0 degrees (i.e. indicating a pitch of the mobile computing device being parallel to the ground level) and 90 degrees (i.e. indicating a pitch of the mobile computing device being perpendicular to the ground level) to angle substantially close to 0 degrees. In another example, if the operating system of the mobile computing device indicates that the volume levels are muted upon playback of the video advertisement, the user engagement has also decreased. In some embodiments, the user engagement is based on a combination of the change in accelerometer value and change in volume level. For example, if the change in the accelerometer values indicate that the mobile computing device is placed with the display screen facing the ground (e.g., face down on a table) and the volume level changes such that the volume level is muted upon playback of the video advertisement, the user engagement is very low. The changes in device engagement data indicate the user is likely not viewing nor listening to the advertisement. However, if the change in the accelerometer values indicate that the mobile computing device is placed with the display screen facing the ground, yet there is no change in volume level, the user engagement score is slightly higher as the user is no longer viewing the advertisement but may be listening to the advertisement audio. Similarly, if volume level is muted upon playback yet there are no detected changes in the accelerometer value, the user engagement score is also slightly higher than if volume level was muted and the accelerometer indicated a substantial change.

The advertisement server uses the changes in the device engagement data determined throughout playback of the video advertisement to determine the cost per impression value of the video advertisement accordingly. For example, if the advertising server receives significant changes in device engagement data from the mobile computing device, the advertising server sets the CPI value as low. If the advertising server receives minor changes in the device engagement data, the advertising server sets the CPI value to high. Embodiments disclosed herein provide significant advantages for advertising entities. Specifically, embodiments disclosed herein allow an advertising server to calculate a more accurate CPI value that is used to charge advertisers. By basing the CPI on user engagement value, the advertising server and the advertising entity can evaluate the effectiveness of the video advertisements and use the user engagement value per advertisement to select and provide better targeted advertisements to end users.

As used herein, the term "device engagement data" refers to any data associated with hardware (e.g., the mobile computing device) or sensors for the hardware to indicate a potential change in the engagement of the data. For example, device engagement data includes any data indicating the spatial orientation or the volume level of a mobile computing device as reported by the operating system executing on the mobile computing device. The device engagement data includes, for example, the pitch, roll, and azimuth values of the mobile computing device indicating the spatial orientation of the mobile computing device. The device engagement data also includes a proximity value indicating the proximity of the displays screen of the mobile computing device to an external object.

As used herein, the term "user engagement" refers to how focused the user of the mobile computing device is on a video advertisement. Low user engagement indicates the user is not viewing the video advertisement and high user engagement indicates that the user is viewing the video advertisement.

Referring now to the drawings, FIG. 1 is a block diagram depicting an advertising server 120 that communicates over a network 115 with a mobile computing device 100 and a video publisher device 110 to provide video content (including video advertisements) to the mobile computing device 100. Mobile computing device 100 includes any device that receives video content, including video advertisements, over the network 115. Examples of mobile computing device 100 include smartphone devices, tablet computers, laptop computers, etc. The mobile computing device 100 includes a memory 102 that stores executable program code for performing operations described herein. For example, memory 102 includes program code for execution of a user engagement engine 104 and a video player 106. Network 115 includes the Internet and also includes local intranets or other suitable communication networks.

To retrieve video content over the network 115, the mobile computing device 100 transmits a request for video content to the video publisher device 110. The video publisher device 110 includes any computing device owned or operated by a content publisher 140. The video publisher device 110 provides access to the main video data 112 owned by the content publisher 140. For example, the video publisher device 110 includes a web server system for the content publisher 140. Examples of a content publisher 140 include a media company or other content provider that provides streaming video services or downloadable video services to the mobile computing device 100 over the network 115. An example of the mobile computing device 110 requesting main video data from the video publisher device 110 is when a user of the mobile computing device 100 logs on, views, or initiates a video stream for main video data 112 via a web browser or other software application. In response, the video publisher device 110 transmits the main video data 112 (i.e. the video content that the user of mobile computing device 100 is requesting) to the mobile computing device 100. Along with the main video data 112, the video publisher device 110 also transmits advertising credentials data identifying the identity of the content publisher 140 using the video publisher device.

Upon receiving the main video data 112, the mobile computing device 100 initiates playback of the main video data 112 via the video player 106 executing in memory 102 of the mobile computing device 100. Additionally, the mobile computing device 100 transmits the advertising credentials data to the advertising server 120 over the network 115. The advertising server 120 includes one or more computer servers that include or have access to database storage 122 that stores multiple video advertisements. The advertising server 120 uses the received advertising credentials data (which identifies the identity of the content publisher 140 using the video publisher device 110) to identify one or more video advertisements 124 relevant to the content publisher 140. The advertising server 120 transmits electronic data comprising the identified video advertisement 124 to the mobile computing device 100. Along with the video advertisement 124, the electronic data also comprises a tracking link referencing a network address for the advertising server 120.

To report the users' engagement and interaction of the video advertisement 124 back to the advertising server 120, the mobile computing device 100 transmits the user engagement information collected as device engagement data to the network address specified in the tracking link. For example, the mobile computing device 100 executes program code for the user engagement engine 104 to collect information on the changes in orientation of the mobile computing device 100 as the video advertisement 124 plays on the video player 106. As another example, the mobile computing device 100 executes program code to collect information on the changes in the volume levels of the mobile computing device 100 as the video advertisement 124 plays on the video player 106. The user engagement engine 104 may be implemented as various forms of program code that interacts with the video player 106 and the operating system of the mobile computing device 100. In one example, the user engagement engine 104 is implemented as a standalone background application that tracks playback of video advertisements on the video player 106 and pings the operating system for device engagement data at various intervals of playback of the video advertisement. In another example, the user engagement engine 104 is a plugin module to the video player 106. In another example, the user engagement engine 104 is part of a larger program in which the video player 106 executes (e.g., the user engagement engine 104 is native application code or a plugin or extension module to a web browser application in which the video player 106 executes).

The device engagement data collected by the mobile computing device 100 provides values that represent the user engagement of the ongoing video advertisement 124. For example, the mobile computing device 100 transmits a command to the operating system executing on the mobile computing device 100 via an application programming interface (API) call or other interface command. The interface command passed to the operating system requests the current pitch and roll values of the mobile computing device 100 as detected by an accelerometer in the mobile computing device 100. Changes in the pitch and roll values of the mobile computing device 100 indicate how the mobile computing device 100 changes position in space. For example, a roll value substantially close to −90 degrees or +90 degrees indicates the mobile computing device is placed parallel to the ground with the display facing the ground. This indicates that the user has placed the mobile computing device 100 on a flat surface, such as a table, with the display facing down. A second interface command to the operating system requests the current volume level of the mobile computing device 100.

Note that pitch values, roll values, and volume levels are provided herein for illustrative purposes. Embodiments herein also provide for collecting device engagement data based on readings from various spatial and context sensors within the mobile computing device 100. For example, the mobile computing device 100 includes a proximity sensor that outputs a proximity value indicating the proximity of the display screen of the device to an external object. The proximity value provides an additional indication of the orientation of the mobile computing device 100. For example, changes in the proximity sensor value indicate, for example, that an external object covers the display screen upon playback of the video advertisement.

Changes in the device engagement data (e.g., pitch value, roll value, volume level, proximity reading, and other sensory data) as the video advertisement plays indicates changes in the user engagement of the video advertisement. The mobile computing device 100 continually monitors device engagement data and changes to the device engagement data as the video advertisement plays. For example, the mobile computing device 100 collects device engagement data at different intervals of playback of the video advertisement 124. For example, the mobile computing device 100 collects device engagement data at the start of playback of the video advertisement 124 on the video player 106. The mobile computing device 100 transmits a communication the advertising server 120 indicating that playback of the video advertisement 124 has started. The communication also includes the initial readings of the initial device engagement data (e.g., data indicating the orientation of the mobile computing device 100 and the volume level of the mobile computing device 100). Once a portion of the video advertisement 124 has played on the video player 106 without the user exiting out of the video advertisement and without other interruptions, the user engagement engine 104 collects a second set of device engagement data. The mobile computing device 100 calculates the difference between the initial device engagement data and the second set of device engagement data to determine the change in the device engagement data. The mobile computing device 100 transmits the collected device engagement data and the changes in the device engagement data to the advertising server 120 via the network address specified in the tracking link. The process of collecting device engagement data, calculating the changes in the device engagement data, and reporting the data to the advertising server 120 at different intervals as the video advertisement 124 plays continues until the video advertisement 124 completes one-hundred percent playback or until the video advertisement is interrupted by the user of the mobile computing device 100. In one embodiment, the user engagement engine 104 collects and reports the device engagement data to the advertising server 120 every twenty-five percent playback interval.

Upon receiving the final set of device engagement data from the mobile computing device 100, the advertising server 120 executes program code for a cost-per-impression (CPI) engine 126. The CPI engine 126 calculates the appropriate CPI value based on the changes to the device engagement data collected during playback of the video advertisement 124. The CPI value is directly correlated to the amount charged by the content publisher 140 to the advertising entity 130 for playback of the video advertisement 124 via the video publisher device 110. A high CPI value results in a higher charge for the video advertisement 124 and a lower CPI value results in a lower charge for the video advertisement 124. As the CPI value is based on how device engagement data changed during playback of the video advertisement 124, the CPI value reflects the user engagement of the video advertisement 124. For example, if the collected device engagement data indicates that the user engagement is low, the CPI engine 126 proportionally scales down the CPI value for the video advertisement 124. If the collected device engagement data indicates that the user engagement is high, the CPI engine 126 proportionally scales up the CPI value for the video advertisement 124. As the device engagement data includes both pitch and roll values from accelerometer data as well as volume level data, the CPI engine 126 takes into account both changes in orientation of the mobile computing device 100 and changes in the volume level when calculating the appropriate CPI value.

Figure 2:
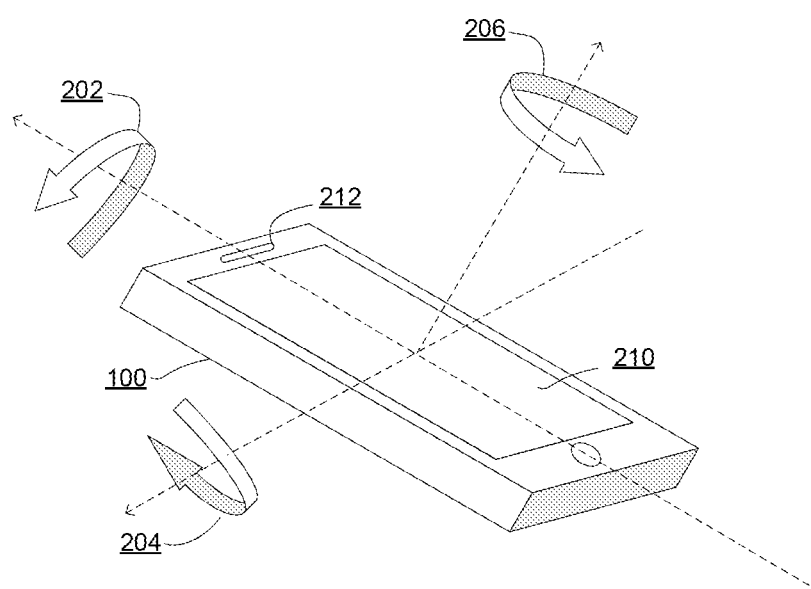
FIG. 2 is a diagram depicting an example of a mobile computing device and spatial axes to describe the orientation of the mobile computing device.

As described above, part of the device engagement data that is collected during playback of the video advertisement 124 includes the spatial orientation (e.g., pitch and roll values) of the mobile computing device 100. FIG. 2 is a diagram depicting changes to spatial orientation of the mobile computing device 100. For illustrative purposes and to help describe the spatial axes that define the orientation of the mobile computing device 100, the mobile computing device 100 in FIG. 2 is shown as a smartphone implementation with a display screen 210 and a speaker 212. The display screen 210 indicates the "front" of the mobile computing device 100 and the speaker 212 indicates the location of the "top" of the mobile computing device 212. FIG. 2 also depicts the spatial axes 202-206 that are used to measure the orientation. Spatial axis 202 passes through the top of the mobile computing device 100 and through the bottom of the mobile computing device 100. Spatial axis 204 passes from one side of the mobile computing device 100 to the other side. Spatial axis 206 passes through the front of the mobile computing device and the back. The orientation of the mobile computing device 100 is determined by the angular values referred to as roll (rotation along spatial axis 202), pitch (rotation along spatial axis 204), and azimuth (rotation along spatial axis 206). As the mobile computing device 100 is rotated along the spatial axis 202, the roll value of the mobile computing device 100 changes. As the mobile computing device 100 is rotated along the spatial axis 204, the pitch value of the mobile computing device changes. As the mobile computing device 100 is rotated along spatial axis 206, the azimuth value of the mobile computing device 100 changes.

The orientation of the mobile computing device 100 is determined by using sensors for determining the spatial orientation of the mobile computing device 100, such an accelerometer or magnetometer included in the mobile computing device 100. The accelerometer includes a hardware device that determines the pitch and roll values of the mobile computing device 100 at a given point of time. The magnetometer includes a hardware device that determines the azimuth value of the mobile computing device 100 at a given point of time. In some embodiments, the magnetometer determines the azimuth value by detecting the orientation of the mobile computing device 100 with respect to the magnetic poles of the earth. The pitch, roll, and azimuth values are measured in rotational units, such as degrees, radians, or other units of measurement. For example, as the mobile computing device 100 rotates along spatial axis 202 in such a way that the display screen 210 changes from facing up to facing down (i.e. facing the ground), the roll value changes by $-\pi$ or $+\pi$ radians depending on whether the phone was rotated clockwise or counter-clockwise along spatial axis 202. Similarly, as the mobile computing device 100 rotates along spatial axis 204 in such a way that the display screen 210 changes from being parallel to the ground to being perpendicular to the ground, the pitch value changes by $+\pi/2$ radians.

Figure 3:
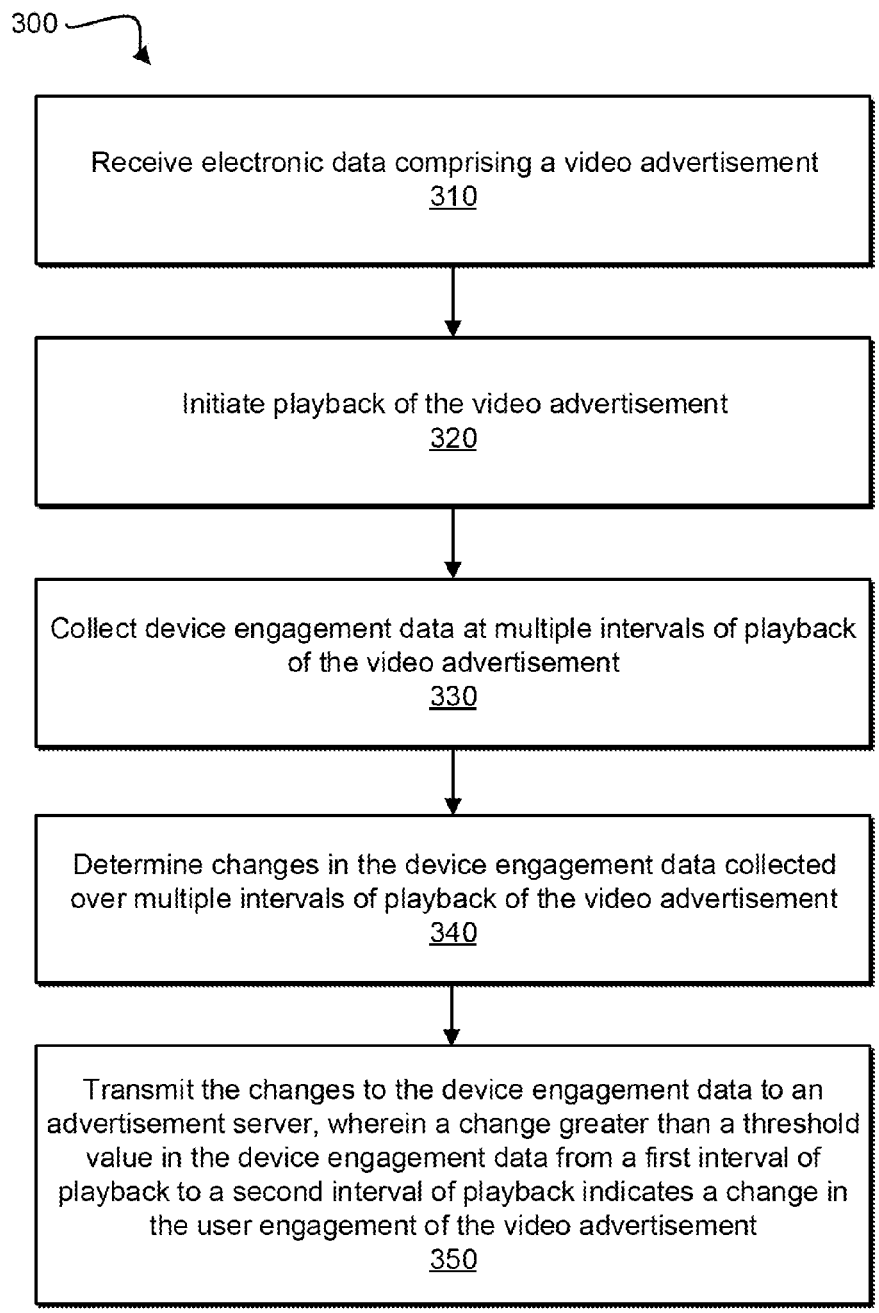
FIG. 3 is a flowchart illustrating an exemplary method for determining changes in device engagement data throughout playback of a video advertisement.

FIG. 3 is a flowchart depicting an example process 300 for determining user engagement of a video advertisement 124. The process 300 may be performed by one or more of the components listed in FIG. 1 or in any suitable computing or communication environment.

The process 300 involves receiving electronic data comprising the video advertisement 124. For example, the mobile computing device 100 receives electronic data transmitted by the advertising server 120 over network 115. The electronic data comprises the video advertisement 124 data stream. As mentioned above with respect to FIG. 1, the electronic data further comprises a tracking link for reporting interaction with the video advertisement 124 back to the advertising server 120. The tracking link comprises, for example, a uniform resource locator (URL) reference, IP address, or other reference to a network address for the advertising server 120.

The process 300 further involves initiating playback of the video advertisement 124, as shown in block 320. For example, a video player application 106 executing in the mobile computing device 100 buffers data packets for the video advertisement 124 in memory 102 and begins playback by rendering video advertisement data on the display screen 210 of the mobile computing device. The playback continues until the video advertisement 124 is fully played or until the video advertisement 124 is interrupted by interaction of the user (e.g., the user of mobile computing device 100 exiting out of the video player application 106)

The process 300 further involves collecting device engagement data at multiple intervals of playback of the video advertisement 124, as shown in block 330. For example, the user engagement engine 104 executing in the mobile computing device 100 issues one or more commands to the underlying operating system of the mobile computing device 100 for retrieving the device engagement data (comprising, for example, the orientation of the mobile computing device 100 and the volume levels of the mobile computing device 100) at the time of the command. An example of a command for requesting the device engagement data is an API call to the operating system instructing the operating system to retrieve the values currently stored in accelerometer hardware in the mobile computing device 100. Another example is an API call instructing the operating system to return the current volume level for the speaker 212 as set in the operating system. In some embodiments, the user engagement engine 104 executes as a background process such that collection of the device engagement data does not interrupt the currently executing foreground process (e.g., the video player application 106).

The device engagement data is collected multiple times over various intervals of playback of the video advertisement 124. For example, the device engagement data is collected by the user engagement engine 104 at the start of playback of the video advertisement 124 and then again collected at certain percentages of playback. For example, the device engagement data is collected every quartile of playback until the video advertisement 124 completes playback (i.e. 100% of the video advertisement plays) or until the video advertisement 124 is interrupted. While collection of device engagement data at every quartile of playback is described for illustrative purposes, the device engagement data may be collected at any interval rate.

The process 300 further involves calculating changes in the multiple sets of device engagement data collected over the various intervals of playback, as shown in block 340. Changes in the device engagement data indicate potential changes in the user engagement of the video advertisement 124. For example, upon start of the video advertisement 124 to the first interval of playback of the video advertisement (e.g., 25% playback of the video advertisement 124), the user of the mobile computing device 100 may move the device from a handheld position to placing it on a table with the display screen face down. The placement of the mobile computing device 100 on a table with the display screen facing down indicates a quick drop in user engagement of the video advertisement 124. In such an example, the roll value and the pitch value of the mobile computing device 100 change by $\pi/4$ and the final position will be such that the roll value is closed to $-\pi+\pi$. A drop in the volume level from the beginning of the video advertisement to 50% playback of the video advertisement is another indication of drop in user engagement.

The user engagement engine 104 in the mobile computing device 100 calculates the changes in the device engagement data. For example, user engagement engine 104 collects device engagement data at multiple intervals of playback, as explained above. Each time the device engagement data is collected, the user engagement engine 104 also calculates the changes in the device engagement data at the current interval of playback. For example, upon collecting device engagement data at the X % playback interval (i.e. once X % of the video advertisement 124 has played on the video player 106), the user engagement engine 104 compares the device engagement data at X % of playback to the device engagement data collected at the beginning of playback. Thus, the user engagement engine 104 calculates differences in the roll and pitch values and the volume levels of the mobile computing device 100 from one interval of playback to a second interval of playback.

The amount of change in the device engagement data that is considered a change in user engagement is referred to as a threshold value. For example, the pitch value and the roll value of the mobile computing device 100 naturally vary over time in slight amounts as the user of the mobile computing device 100 manipulates the mobile computing device 100 in space. This is because the user of the mobile device may not hold the mobile computing device 100 perfectly steady. A change in the pitch value and the roll value from a first interval of playback to a second interval of playback indicates a change in user engagement if the change is greater than the threshold value. In some embodiments, the mobile computing device 100 is configured with pre-determined threshold values. The mobile computing device 100 compares changes in the device engagement data to the threshold values to determine if there was a change in the user engagement.

The following are example scenarios from the least user engagement value to the maximum user engagement value ("1" being least user engagement in this example and "4" being maximum user engagement):

(1) Lowest User Engagement: Volume level of the mobile computing device 100 is muted once the video advertisement begins playback and the roll value of the mobile computing device 100 is close to $-\pi$ radians or $+\pi$ radians (indicating the mobile computing device 100 is placed parallel to the ground with the display screen facing the ground). In some embodiments, changes in the proximity sensor value from the mobile computing device 100 are also used to determine if the display device is covered.

(2) The pitch value and the roll value of the mobile computing device 100 change greater than a threshold value (as described above with respect to FIG. 3); the mobile computing device 100 is placed parallel to the ground with the display screen facing up (i.e. roll value is close to 0).

(3) The volume level of the mobile computing device 100 is lowered but there is no change in the pitch values and roll values.

(4) Highest user engagement: No change in the volume level and no change in the roll value and pitch value.

While the embodiment described above indicates that the mobile computing device 100 calculates the changes to the device engagement data, the advertising server 120 calculates the changes in the device engagement data in other embodiments. For example, upon collecting device engagement data at each interval of playback of the video advertisement, the mobile computing device 100 transmits the device engagement data to the advertising server 120. Once the advertising server 120 receives more than one set of device engagement data, the advertising server 120 calculates changes in the device engagement data in the manner described above.

The process 300 further involves transmitting the device engagement data and the determined changes in the device engagement data to the advertising server 120, as shown in block 350. For example, the mobile computing device 100 transmits a communication that comprises the collected device engagement data and to changes in the device engagement data to the network address specified in the tracking link received with the electronic data that included the video advertisement 124 (as described above with respect to block 310). In one embodiment, the mobile computing device 100 transmits the collected device engagement data and changes to the device engagement data upon every collection interval. For example, upon initiating the start of the video advertisement, the mobile computing device 100 collects a first set of the device engagement data in the manner described above. The mobile computing device 100 further transmits the first set of device engagement data to the advertising server 120. Upon playback of a portion of the video advertisement (e.g., 25% of the video advertisement), the mobile computing device 100 collects a second set of device engagement data. The mobile computing device 100 determines the change in the second set of device engagement data compared to the first set of device engagement data (e.g., changes to the pitch value, roll value, and the volume level of the mobile computing device 100). The mobile computing device 100 transmits the second set of device engagement data and the changes to the device engagement data to the advertising server 120. This process continues until the video advertisement completes playback within the video player 106 or until the video advertisement is interrupted. If playback of the video advertisement is interrupted, the mobile computing device 100 transmits a communication to the advertising server 120 indicating that the playback was interrupted and further indicating the percentage of the video advertisement that successfully played.

In other embodiments, the mobile computing device 100 transmits all device engagement data collected for the given video advertisement 124 and changes to the device engagement data over the various intervals of playback to the advertising server once the video advertisement 124 completes playback or once the video advertisement is interrupted.

Figure 4:
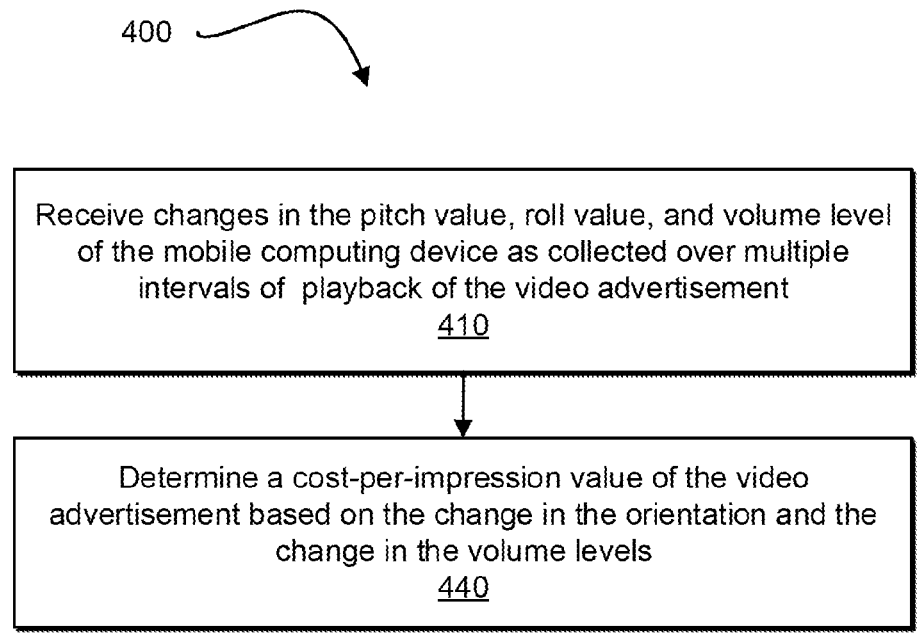
FIG. 4 is a flowchart illustrating an alternate method for calculating a cost-per-impression value based on changes in the device engagement data throughout playback of the video advertisement.

The advertising server 120 uses the changes in the device engagement data to determine the user engagement of the video advertisement 124 and correspondingly a CPI value of the video advertisement 124. The CPI value is adjusted based on the changes in the device engagement data through playback of the video advertisement. FIG. 4 depicts a flowchart for process 400 for determining the CPI value of the video advertisement at the advertising server 100.

The process 400 involves receiving changes in the pitch value, the roll value, and the volume level of the mobile computing device, the pitch value, the roll value, and the volume level collected over multiple intervals of playback of the video advertisement. For example, the mobile computing device 100 calculates changes in the pitch value, roll value, and volume levels through playback of the video advertisement 124 in the manner described above with reference to FIG. At each interval of playback, the pitch value, roll value, and volume level and the changes to said values as compared to the beginning of playback of the video advertisement are transmitted to and received by the advertising server 120.

The process 400 further involves determining a CPI value of the video advertisement based on the change in the orientation and the change in the volume levels of the mobile computing device, as shown in block 420. As described above, the changes in the orientation and the volume levels of the mobile computing device 100 indicate changes in the user engagement of the video advertisement. In one embodiment, the CPI value of the video advertisement, as determined by the CPI engine 126 executing in the advertising server 200, is directly proportional to the user engagement of the video advertisement. For example, if the changes in orientation indicate that the mobile computing device 100 is placed parallel to the ground with the display screen facing the ground and if the volume level is muted between the beginning of the video advertisement and the first interval of playback of the video advertisement (e.g., before 25% of playback), the user engagement is low. In response, the advertising server 120 determines that the CPI value is low. In another example, the advertising server 120 determines a higher CPI value if there are no changes in orientation but the volume level is muted. In another example, the advertising server 120 determines the highest CPI value if there are no changes to the orientation or the volume level of the mobile computing device 100 throughout playback of the video advertisement.

As explained above, in one example, the user engagement value takes a value that can be between 1 and 4 (indicating lowest engagement and highest engagement, respectively). The CPI for the video advertisement is set based on the detected user engagement value. In one example, based on the user engagement value the CPI value for the video advertisement changes from a low value to a high value. In this example, the CPI value is set to $0.5 when the user engagement is low and $2 when the user engagement is high. Depending on the user engagement value, the CPI is set to a range between $0.5 to $2 for the video advertisement served. As a more general example of how the user engagement value is used to calculate the CPI value, if the user engagement value for a video advertisement served is u, and the CPI value range is from $CPI_{min}$ to $CPI_{max}$, then the CPI value for the video advertisement served will be $CPI_{min} + (CPI_{max} - CPI_{min})*(u-1)/3$.

In some embodiments, in addition to calculating the CPI value, the advertising server 120 uses the changes in device engagement data to determine whether to provide a "skip" option in the video player 106. For example, if changes to the device engagement indicate that user engagement is low (e.g., changes to the device engagement are greater than a threshold value), the advertising server 120 transmits a communication to the mobile computing device 100 instructing the mobile computing device 100 to provide a user interface element on the video player 106 allowing the user to skip the remainder of the video advertisement (e.g., bypass the advertisement).

Figure 5:
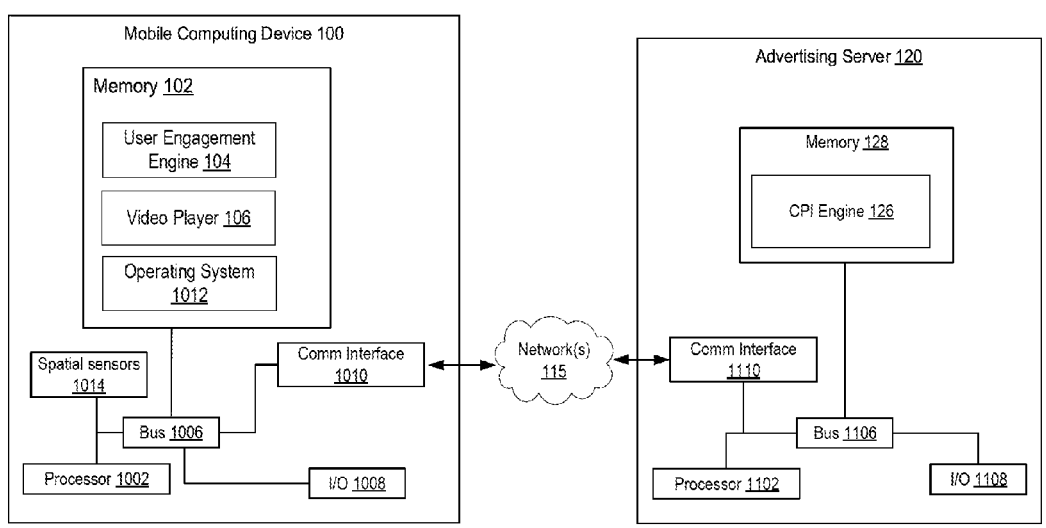
FIG. 5 is a block diagram depicting example hardware implementations for the components described in FIG. 1.

Any suitable computing system or group of computing systems can be used to implement the mobile computing device 100 and advertising server 120. For example, FIG. 5 is a block diagram depicting examples of implementations of such components. The mobile computing device 100 includes a processor 1002 that is communicatively coupled to the memory 102 and that executes computer-executable program code or accesses information stored in the memory 102. The processor 1002 comprises, for example, a microprocessor, an application-specific integrated circuit ("ASIC"), a state machine, or other processing device. The processor 1002 includes one processing device or more than one processing device. Such a processor is included or may be in communication with a computer-readable medium storing instructions that, when executed by the processor 1002, cause the processor to perform the operations described herein.

The memory 102 includes any suitable non-transitory computer-readable medium. The computer-readable medium includes any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The mobile computing device 100 also comprises a number of external or internal devices such as input or output devices. For example, the mobile computing system 100 is shown with an input/output ("I/O") interface 1008 that receives input from input devices or provide output to output devices. The display screen 210 (shown in FIG. 2), for example, is communicatively coupled to I/O interface 1008. The mobile computing device 100 also includes spatial sensors 1014. Spatial sensors 1014 include, for example, an accelerometer sensor, a proximity sensor, a magnetometer sensor, and other sensors that provide data for determining the orientation of mobile computing device 100. A bus 1006 is also included in the mobile computing system 100. The bus 1006 communicatively couples one or more components of the mobile computing system 100.

The mobile computing device 100 executes program code that configures the processor 1002 to perform one or more of the operations described above. The program code includes one or more of the user engagement engine 104, the video player 106, and the operating system 1012. The program code is resident in the memory 102 or any suitable computer-readable medium and is executed by the processor 1002 or any other suitable processor. In additional or alternative embodiments, one or more modules are resident in a memory that is accessible via a data network, such as a memory accessible to a cloud service.

The mobile computing device 100 also includes a network interface device 1010. The network interface device 1010 includes any device or group of devices suitable for establishing a wired or wireless data connection to one or more data networks 115. Non-limiting examples of the network interface device 1010 include an Ethernet network adapter, a modem, or the like. The computing device 100 transmits messages as electronic or optical signals via the network interface device 1010. For example, the computing device 100 transmits communication including the device engagement data and changes in device engagement data throughout playback of the video advertisement, as described above with reference to FIGS. 1-4, to advertising server 120 via network 115.

Similar to the computing device 100, the advertising server 120 also includes a processor 1102, I/O interface 1108, communication interface 1110, and memory 128 communicatively coupled via a bus 1106. The memory 128 includes non-transitory computer-readable memory as described above and stores program code defining operations of the advertising server 120. The processor 1102 executes the computer-executable program code or accesses information stored in the memory 128. For example, the advertising server 120 includes memory 128 that stores program code for the CPI engine 126. Upon execution by processor 1102, the program code for the CPI engine 126 performs the steps and functions for described above with respect to FIGS. 1-4. For example, the CPI engine 126 determines the CPI value for the video advertisement based on the changes in the device engagement data received from the mobile computing device 100.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method for determining user engagement with a video advertisement viewed on a mobile computing device over an electronic network, the method comprising:
   receiving, by the mobile computing device, a video and a credential from a video publisher device of a content publisher, the credential comprising an identifier of the content publisher of the video;
   playing, by the mobile computing device, the video on a video player executing on the mobile computing device;
   transmitting, by the mobile computing device, the credential to an advertising server;
   receiving, by the mobile computing device over the electronic network from the advertising server, the video advertisement and a tracking link associated with reporting user engagement data to the advertising server, the video advertisement and the tracking link received based on the identifier of the content publisher from the credential transmitted to the advertising server associated with the video;
   initiating, by the mobile computing device, playback of the video advertisement on the video player;
   collecting, by the mobile computing device, device engagement data at multiple intervals of playback of the video advertisement based on a sensor of the mobile computing device;
   determining, by the mobile computing device, a change in the device engagement data from a first interval of playback of the video advertisement to a second interval of playback of the video advertisement; and
   transmitting, by the mobile computing device, the change in the device engagement data to a network location specified in the tracking link, the change facilitating an evaluation of the video advertisement by the advertising server.

2. The method of claim 1, wherein the device engagement data comprises a pitch value of the mobile computing device and a roll value of the mobile computing device, the pitch value and the roll value obtained from application programming interface commands passed to an operating system of the mobile computing device instructing the operating system to retrieve information from an accelerometer of the mobile computing device.

3. The method of claim 2, wherein the device engagement data further comprises a volume level of the playback of the video advertisement on the mobile computing device.

4. The method of claim 1, wherein collecting the device engagement data comprises collecting a first set of device engagement data at initial playback of the video advertisement and collecting additional sets of device engagement data at every twenty-five percent playback interval of the video advertisement until the video advertisement either completes playback or until the video advertisement is interrupted.

5. The method of claim 1, wherein the device engagement data is collected as a background process executing on the mobile computing device without interrupting a current foreground process.

6. The method of claim 1, further comprising determining the user engagement of the video advertisement falls in a user engagement level based on the change, wherein:
   the user engagement falls in a first user engagement level based on the change comprising a muting of the mobile computing device upon a start of the playback of the video advertisement and a roll value of the mobile computing device is proximate to $-\pi$ or $+\pi$ radians;
   the user engagement falls in a second user engagement level based on the change comprising changes to a pitch value and the roll value greater than a threshold value;
   the user engagement falls in a third user engagement level based on the change comprising a change to the volume level and no changes the pitch value and the roll value; and
   the user engagement falls in a fourth user engagement level based on the change comprising no changes to the volume level, the pitch value, and the roll value.

7. The method of claim 1, further comprising:
   determining that the change comprises one of a plurality of predefined combinations of: (i) an update to a volume level of the mobile device during the playback of the video advertisement and (ii) an update to one or more of a roll value or a pitch value of pitch value of the mobile computing device; and determining the user engagement of the video advertisement falls in one of a plurality of predefined user engagement levels based on the determined predefined combination.

8. A method for determining user engagement of a video advertisement transmitted to a mobile computing device over an electronic network, the method comprising:
receiving, by a server and from a video player executing on a mobile computing device, a credential and a request for a video advertisement to be presented at the mobile computing device in association with a video, the credential comprising an identifier of a content publisher of the video;
transmitting, by the server and to a video player executing on a mobile computing device, electronic data comprising a video advertisement and a tracking link associated with reporting device engagement data to the server, the electronic data transmitted based on Hall the identifier of the content publisher from the credential;
receiving, by the server and from the mobile computing device, second electronic data comprising the device engagement data for a first interval of playback of the video advertisement and a second interval of playback of the video advertisement, the device engagement data received based on the tracking link and a sensor of the mobile computing device; and
determining, by the server, a change in the device engagement data between the first interval of playback to the second interval of playback, wherein a change greater than a threshold value indicates a change in the user engagement of the video advertisement.

9. The method of claim 8, wherein the device engagement data comprises a pitch value of the mobile computing device and a roll value of the mobile computing device, the pitch value and the roll value obtained from application programming interface commands passed to an operating system of the mobile computing device instructing the operating system to retrieve information from an accelerometer of the mobile computing device.

10. The method of claim 9, wherein the device engagement data further comprises a volume level of the mobile computing device, and wherein the cost-per-impression value of the video advertisement is based on changes in the pitch value, changes in the roll value, and changes in the volume level across multiple intervals of playback of the video advertisement.

11. The method of claim 8, further comprising:
determining a cost-per-impression value of the video advertisement based on the change in the device engagement data, wherein an increase in the user engagement results in a proportional increase in a cost-per-impression value of the video advertisement and a decrease in the user engagement results in a proportional decrease in the cost-per-impression value of the video advertisement.

12. The method of claim 8, wherein the device engagement data comprises a first set of device engagement data collected at the first interval of playback and a second set of device engagement data collected at the second interval of playback, and wherein the method further comprises:
calculating the change in the device engagement data based on the first set of device engagement data and the second set of device engagement data.

13. The method of claim 12, further comprising:
in response to change in the device engagement data being greater than a threshold value, transmitting a communication to the mobile computing device instructing the mobile computing device to present a user interface (UI) skip button on an interface of the video player to bypass the video advertisement.

14. The method of claim 8, wherein the second electronic signal further comprises the change in the device engagement data between the first interval of playback and the second interval of playback.

15. A system for determining user engagement of a video advertisement, the system comprising:
a processor; and
a memory communicatively coupled to the processor, wherein the processor is configured to execute instructions included in the memory to perform operations comprising:
causing, by a mobile computing device or an advertising server, playback of a video advertisement on a video player executing on the mobile computing device, the playback associated with playback of a video on the video player, the video advertisement provided to the mobile computing device from the advertising server based on a transmission of a credential from the mobile device to the advertising server, the credential comprising an identifier of a content publisher of the video;
collecting, based on a tracking link associated with the video advertisement, device engagement data at multiple intervals of playback of the video advertisement, the device engagement data comprising pitch values, roll values, and volume levels of the mobile computing device, the tracking link provided from the advertising server to the mobile computing device based on the identifier of the content publisher from the credential;
determining a change in the device engagement data from a first interval of playback of the video advertisement to a second interval of playback of the video advertisement, wherein a change greater than a threshold value indicates a change in the user engagement of the video advertisement.

16. The system of claim 15, wherein the pitch value and the roll value are obtained from application programming interface commands passed to an operating system of the mobile computing device instructing the operating system to retrieve information from an accelerometer of the mobile computing device.

17. The system of claim 16, wherein the operation of causing playback of the video advertisement comprises:
receiving, by the mobile computing device, electronic data comprising the video advertisement and a tracking link for reporting the device engagement data to the advertisement server; and
initiating playback of the video advertisement on the video player executing on the mobile computing device,
and wherein the processor is configured to execute instructions to perform operations further comprising:
transmitting the change in the device engagement data to a network location specified in a tracking link.

18. The system of claim 15, wherein collecting the device engagement data comprises collecting a first set of device engagement data at initial playback of the video advertisement and collecting additional sets of device engagement data at every twenty-five percent playback interval of the video advertisement until the video advertisement either completes playback or until the video advertisement is interrupted.

19. The system of claim 15, wherein an increase in the user engagement results in a proportional increase in a cost-per-impression value of the video advertisement and a decrease in the user engagement results in a proportional decrease in the cost-per-impression value of the video advertisement.

20. The system of claim 15, wherein the device engagement data is collected as a background process executing on the mobile computing device without interrupting a current foreground process.

* * * * *